United States Patent
Yamamoto et al.

(10) Patent No.: US 6,396,633 B1
(45) Date of Patent: May 28, 2002

(54) OPTICAL REFLECTOR AND MANUFACTURING METHOD THEREOF

(75) Inventors: Toru Yamamoto; Masahiro Hirata; Yukio Sueyoshi, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/569,786

(22) Filed: May 12, 2000

(30) Foreign Application Priority Data

May 13, 1999 (JP) ............................................ 11-132372

(51) Int. Cl.[7] .................................................. G02B 1/10
(52) U.S. Cl. ......................... 359/586; 359/584; 359/580
(58) Field of Search ................................ 359/584, 586, 359/580, 884

(56) References Cited

U.S. PATENT DOCUMENTS 5,580,364 A * 12/1996 Goodman .................... 359/839
5,745,291 A * 4/1998 Jenkinson .................... 359/586

FOREIGN PATENT DOCUMENTS

JP 6-183787 7/1994
JP 8-508708 9/1996

* cited by examiner

Primary Examiner—Darren Schuberg
Assistant Examiner—Leo Boutsikaris
(74) Attorney, Agent, or Firm—Merchant & Gould P.C.

(57) ABSTRACT

In an optical reflector and a manufacturing method thereof, the reflector is superior in durability and has a high reflectivity to visible light, but not being conspicuous in color tone of reflection. The optical reflector comprises a glass substrate, on which are piled up a film of refractive index n1, a film of refractive index n2, a film of refractive index n3, and a film of refractive index n4, sequentially, wherein the thickness of the films are adjusted so that a relationship, $n1 \geq n4 > n3 > n2$, is established among those refractive indices n1, n2, n3 and n4. The film of refractive index n2 is from 30 nm to 60 nm in the film thickness, a reflectivity to visible light is equal to or greater than 75% upon the surface of the film of refractive index n4, and the value $\{(a^*)^2+(b^*)^2\}^{1/2}$ is from 0 to 10 when representing the color tone of reflected light upon this film by $a^*$ and $b^*$ (psychometric chroma coordinates).

12 Claims, 2 Drawing Sheets

OPTICAL REFLECTOR AND MANUFACTURING METHOD THEREOF

BACKGROUND OF THE INVENTION

1. Field of the Invention

The present invention relates to a reflector having a high reflectivity of visible light, in particular for use in glass products, such as a mirror, etc., and it relates to a manufacturing method thereof.

2. Description of Prior Art

Generally, upon a mirror is formed a metal film having a high reflectivity, such as a film of silver, aluminum, etc. With such the mirror using silver, a solution of silver salt is applied upon a glass plate, to thereby form a silver layer or film through a reductive reaction on the surface of the glass plate. However, the silver film itself is easily oxidized, and also is easily eroded, therefore being very weak or inferior in the durability thereof. Accordingly, it is impossible to obtain a mirror by this method alone that is practically useful or endurable, and there is a necessity of forming a protection layer upon the surface of the silver film. Further, because of encroachment or invasion of water and so on from the edge (i.e., an outer periphery edge portion of the silver film), there is also a necessity of protection treatment even on the edge thereof, therefore a special protective coating treatment must be carried out, in particular, for the purpose of obtaining the mirror using silver which can be used on a washstand and/or in a bathroom. Also in many cases, an opaque material is applied as the protection layer or film, therefore the mirror can be formed only as a back-coated mirror, whereby the mirror obtained cannot be prevented from causing a dual-image due to the reflection of light upon a front surface and upon a reverse surface thereof.

With the mirror using aluminum film in the place thereof, in general, the aluminum film is formed by a method such as a vacuum evaporation method and/or a spattering method, necessitating the use of a vacuum apparatus or equipment as a facility thereof. Also, as it takes a period of time for forming the film by this method, there is a tendency that the cost for manufacturing thereof is increased due to a loss of efficiency in production or productivity. Further, the aluminum film formed through the above-mentioned method comes to be one which is low in durability, therefore a protection film is necessary for producing a practical mirror by this method as well.

As a method not requiring the use of vacuum apparatus or equipment, a method for manufacturing a mirror having the reflectivity being equal to or higher than 70%, by forming one-by-one a reflection layer and a reflection enforcement layer, using a normal pressure CVD (Chemical Vapor Deposition) method, is disclosed in Japanese Laid-Open Patent Hei 6-183787 (1994). In more detail, disclosed is a mirror in which a film having a high refractive index, such as a silicon film, is used as the reflection layer, on which is formed the reflection enforcement layer, including a layer having a low refractive index, such as a film of silicon oxide or the like, and a film of high refractive index, such as a silicon film, or a film of tin oxide, titanium oxide, etc., sequentially applied.

In Japanese Laid-Open Patent Hei 6-183787 (1994), the silicon film is mainly used as a reflection layer, and as a low refractive index layer for forming the reflection enforcement layer is used a layer of silicon oxide, while as a high refractive index layer is used the film of silicon, titanium oxide, or tin oxide, etc.

In a case where the silicon film is used as the uppermost film, there is a necessity that a further protection layer is formed because of the low durability of the silicon layer.

In a case where the film of titanium oxide or tin oxide is used, though no such problem in the durability thereof arises, there is a necessity that the film of silicon oxide as the low refractive index layer must be equal to or greater than 70 nm in thickness, so as to make a reflection color inconspicuous, under the condition that the reflectivity to visible light is equal or greater than 75%. However, a large amount of powder is generated when forming the film of silicon oxide through a pyrolytic method, and this may be taken into the film as a contaminating foreign body or may cause pinholes therein, thereby reducing a yield rate. Further, the powder is accumulated or piled up in a periphery of the apparatus and/or in exhaust pipes thereof, thus presenting a cause of reduction in the stability of the film-forming process.

For avoiding the drawbacks mentioned above, there can be considered a countermeasure wherein the supplied amount of the raw material is reduced so as to slow down the speed of forming films, however it is difficult to obtain the film thickness being equal to or greater than 70 nm, by this method.

Also, in Japanese Laid-Open Patent Hei 8-508708 (1996), there is proposed a mirror, wherein the low refractive film is made to be equal to or greater than 10 nm and be equal to or less than 40 nm in the thickness thereof, and the film of tin oxide is formed upon the surface thereof. However, in this case, the reflectivity to visible light is equal to or greater than 35% and is less than 70%, and further the color tone of reflected light has a bluish tinge.

SUMMARY OF THE INVENTION

According to the present invention, for dissolving the problems mentioned in the above, there is provided an optical reflector having a glass substrate, wherein upon at least one of main surfaces thereof is applied a film having a refractive index n1 at a wavelength of 550 nm; a film having a refractive index n2 at said wavelength; a film having a refractive index n3 at said wavelength; and a film having a refractive index n4 at said wavelength, sequentially, wherein:

there is established a relationship as indicated below among the refractive indices n1, n2, n3 and n4;

$$n1 \geq n4 > n3 > n2$$

film thickness of said film of the refractive index n2 is equal to or greater than 30 nm and is equal to or less than 60 nm;

a reflectivity to visible light of said film of the refractive index n4 is equal to or greater than 75%; and a value of $\{(a^*)^2+(b^*)^2\}^{1/2}$ is equal to or greater than 0 and is equal to or less than 10, when representing a reflective color tone upon the surface of said film of refractive indices n4 by $a^*$ and $b^*$ (psychometric chroma coordinates).

Also, according to the present invention, it is preferable that said film having the refractive index n2 is one which contains silicon oxide ($SiO_2$) as a main ingredient thereof, that said film having the refractive index n3 is one which contains tin oxide (SnO) as a main ingredient thereof, said film having the refractive index n4 is one which contains titanium oxide ($TiO_2$) as a main ingredient thereof, and said film having the refractive index n1 is one which contains silicon (Si) as a main ingredient thereof.

Further, according to the present invention, it is preferable that an undercoating film is formed between said film having the refractive index n1 and said glass substrate, and it is further preferable that said undercoating film is a film of tin oxide.

Also, according to the present invention, it is preferable that film thickness is equal to or greater than 15 nm and is equal to or less than 45 nm for the film having the refractive index n1; is equal to or greater than 10 nm and is equal to or less than 80 nm for the film having the refractive index n3; and is equal to or greater than 10 nm and is equal to or less than 80 nm for the film having the refractive index n4, and it may be possible that an opaque layer is formed on a side of said glass substrate, being reverse to that on which said films are formed.

Also, according to the present invention, there is provided a method for manufacturing the optical reflector having a glass substrate, comprising steps of: forming a film having a refractive index n1 at a wavelength of 550 nm; forming a film having a refractive index n2 at said wavelength; forming a film having a refractive index n3 at said wavelength; and forming a film having a refractive index n4 at said wavelength, sequentially, upon at least one of main surfaces of said substrate. The relative values of the refractive indices are represented as $n1 \geq n4 > n3 > n2$.

Further, according to the present invention, it is also preferable that an undercoating film is formed between said film having the refractive index n1 and said glass substrate, and that said undercoating film, said film having the refractive index n1, said film having the refractive index n2, said film having the refractive index n3 and said film having the refractive index n4 are formed, sequentially, by means of a pyrolytic method upon a surface of said glass substrate at high temperature.

Namely, according to the present invention, forming the film having the refractive index n1 at the wavelength of 550 nm; the film having the refractive index n2 at the said wavelength; the film having the refractive index n3 at the said wavelength; and the film having the refractive index n4 at the said wavelength, sequentially, upon at least one of main surfaces of the glass substrate, and making the film thickness of the film of the refractive index n2 equal or greater than 30 nm and is equal or less than 60 nm, it is possible to improve the efficacy of the optical reflector by employing film formation using a pyrolytic method, thereby providing the optical reflector of high performance and good durability, having a value of $\{(a^*)^2+(b^*)^2\}^{1/2}$ being equal to or greater than 0 and being equal to or less than 10, when representing a reflective color tone upon surface of said film of refractive indices n4 by a* and b* (psychometric chroma coordinates).

DETAILED DESCRIPTION OF PREFERRED EMBODIMENT(S)

Figure 1A:
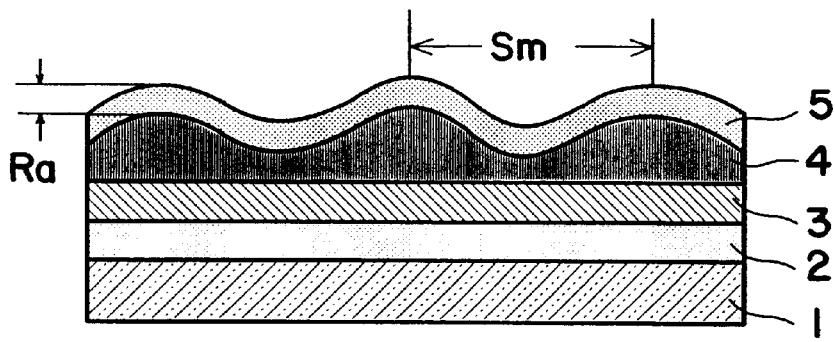
FIGS. 1(a) to (c) are enlarged cross-sectional views showing embodiments of an optical reflector according to the present invention, respectively.

Hereinafter, embodiments according to the present invention will be fully explained with reference to the attached drawings.

According to the present invention, there can be obtained an optical reflector having a glass substrate, a film having a refractive index n1 at a wavelength of 550 nm; a film having a refractive index n2 at the wavelength of 550 nm; a film having a refractive index n3 at the wavelength of 550 nm; and a film having a refractive index n4 at the wavelength of 550 nm, sequentially formed upon at least one of main surfaces thereof, wherein there is established a relationship $n1 \geq n4 > n3 > n2$ among the refractive indices n1, n2, n3 and n4, said optical reflector thereby having a reflectivity to visible light being equal or greater than 75% and having a value of $\{(a^*)^2+(b^*)^2\}^{1/2}$ being equal to or greater than 0 and being equal to or less than 10, when representing a reflective color tone by a* and b* (psychometric chroma coordinates), even when the film thickness of said film of the refractive index n2 is equal or greater than 30 nm and is equal or less than 60 nm.

The optical reflector having a high reflectivity and an inconspicuous color tone of reflection can be obtained by applying the construction of multi-layered films, wherein they are formed upon the film of refractive index n1 to function as the reflection layer, gradually changing the refractive index thereof from a low refractive index to a high one as the number of layers increase.

If the thickness of the above-mentioned film of refractive index n2 is less than 30 nm, it is impossible to satisfy both a predetermined reflectivity and a predetermined color, while if it exceeds 60 nm, the productivity of manufacture is impaired, thereby causing increase in manufacturing costs, and it is impossible to achieve the advantages offered by the present invention.

The larger the difference between the refractive indices n1 and n2 (n1>n2), the larger the reflectivity to visible light, therefore it is preferable that this difference is as large as possible.

The film of refractive index n1 at a wavelength of 550 nm, according to the present invention, is preferably a film that contains silicon as the main ingredient thereof. The reason for this is that, in particular, the silicon has a high refractive index and further that such a film can be formed easily through the pyrolytic method. It is also possible to contain carbon, nitrogen, oxygen, etc., in the silicon film. In this case, the refractive index n1, though varying depending upon the included substances and the amount of impurities contained therein, lies within a range, being equal to or greater than 3.0 and being equal to or less than 5.5.

The film of refractive index n2 at a wavelength of 550 nm, according to the present invention, is preferably a film that contains silicon oxide as the main ingredient thereof. The reason for this is that, in particular, the silicon oxide has a low refractive index and further that such a film can be formed easily through the pyrolytic method. It is also possible to contain nitrogen, carbon, fluorine, titanium, tin, aluminum, boron, phosphorus, etc., in the silicon oxide film. In this case, the refractive index n2, though varying depending upon the included substances and the amount of impurities contained therein, lies within a range, being equal to or greater than 1.4 and being equal to or less than 1.6.

The film of refractive index n4 at a wavelength of 550 nm, according to the present invention, is preferably made of titanium oxide. The reason for this is that, in particular, the titanium oxide has a relatively high refractive index, that such a film can be formed easily through the pyrolytic method, and further that it has good durability thus introducing no problems if it is exposed at the outermost surface. It is also possible to contain tin, fluorine, chlorine, carbon, nitrogen, silicon, etc., in the titanium oxide film. In this case, the refractive index n4, though varying depending upon the included substances and the amount of impurities contained therein, lies within a range, being equal to or greater than 2.2 and being equal to or less than 2.8.

The film of refractive index n3 at a wavelength of 550 nm, according to the present invention, is preferably made of tin oxide. The reason for this is that the refractive index thereof is of a value between those of above-mentioned refractive indices n2 and n4 and further that such a film can be formed easily through the pyrolytic method. It is also possible to contain indium, fluorine, antimony, chlorine, carbon, silicon, etc., in the tin oxide film. In this case, the refractive index n3, though varying depending upon the included substances and the amount of impurities contained therein, lies within a range, being equal to or greater than 1.8 and being equal to or less than 2.2.

According to the present invention, it may be possible to form an undercoating film between the film having a refractive index of n1 and the glass substrate. When using soda lime glass as the glass substrate, it is possible to prevent alkali from being diffused into the film of refractive index n1 by forming the undercoating film, thereby preventing any decrease in the refractive index thereof.

As an example of this undercoating film can be put forward a film comprised of tin oxide. Also, it may be possible to include indium, fluorine, antimony, chlorine, carbon, silicon, etc., in this tin oxide film. The film thickness of this undercoating film is preferably equal to or greater than 1 nm and is equal to or less than 100 nm, and ideally, it lies within a range being equal to or greater than 10 nm and being equal to or less than 50 nm. When the film thickness of the undercoating film is too thick, a haze factor or ratio becomes too large, bringing about diffused or irregular reflection in the reflection light, therefore it is not preferable.

In an optical reflector having such the films as mentioned above stacked thereon, it is preferable that the film thickness of the films of refractive indices n1, n3 and n4 are within a range indicated below, that the reflectivity to visible light is equal to or greater than 75%, and that the value of $\{(a^*)^2+(b^*)^2\}^{1/2}$ is equal to or greater than 0 and is equal to or less than 10, when representing a reflective color tone by a* and b* (psychometric chroma coordinates).

When the film thickness of any among the films falls out of the range indicated below, the reflectivity to visible light may become lower than 75%, or the value of $\{(a^*)^2+(b^*)^2\}^{1/2}$ may become greater than 10, when representing the reflective color tone by a* and b* (psychometric chroma coordinates).

The thickness of the film having the refractive index n1 is equal to or greater than 15 nm, and is equal to or less than 45 nm;

the thickness of the film having the refractive index n3 is equal to or greater than 10 nm, and is equal to or less than 80 nm; and the thickness of the film having the refractive index n4 is equal to or greater than 10 nm, and is equal to or less than 80 nm.

The optical reflector obtains the transmittance to visible light being equal to or less than 25%, thereby enabling that it may be used as a half mirror.

Also, in a case of the reflector being used as a mirror, an opaque layer may be formed on the glass surface on the reverse side with respect to the above-described films, so that the image on the reverse side surface cannot been seen through the reflector. It is also possible to adjust the color of the reflection upon the film surface by changing the color of the opaque layer. Also, by forming another opaque layer outside (relative to the substrate) of the film of refractive index n4 as the most outer layer, it is possible to use the reflector as a back-coated mirror. In this case, for increasing the reflectivity to visible light at the back surface, it is preferable to form the films mentioned above on the substrate, i.e., the film of refractive index n4, the film of refractive index n3 and the film of refractive index n1, on the glass substrate, sequentially.

On the outermost surface of the films mentioned above, i.e., on an outer side of the film of refractive index n4 as the most outer layer, there can be formed concave/convex patterning by utilizing the crystal structure of tin oxide and/or titanium oxide. Further, by forming on this an overcoating film, such as of silicon oxide, etc., it is possible to obtain a hydrophilic property thereof, and further it is possible to obtain a surface which exhibits such hydrophilic properties durably and lastingly.

As the method for forming each layer, any one can be applied, such as a vacuum evaporation method, a spattering method, a sol-gel method, a liquid-phase epitaxy method, an enameling method, a spray method, a CVD (Chemical Vapor Deposition) method, etc., however, in particular the spray pyrolytic method and the CVD (Chemical Vapor Deposition) are effective, in which the ingredients are supplied upon the glass plate of high temperature so as to form the films thereon utilizing the heat of the glass plate.

As the glass substrate may be applied any kind of glass plate upon which the above-mentioned films can be formed, however a glass substrate is preferable, such as a soda lime glass, etc., which can be produced through a float glass process having a high level of productivity.

The above-mentioned glass plate or substrate of high temperature may be obtained by re-heating the glass which was formed in advance in a plate-like form, however it is preferable to apply such a method, wherein the ingredients are supplied upon the glass surface within the tin bath or when the glass plate comes out therefrom in the manufacturing of the float glass, because there is no necessity of a heating apparatus nor equipment when utilizing what is sometimes referred to as an on-line CVD method, and it is possible to deposit the layers on a large and/or wide area upon a large glass surface.

It is also possible to apply a method combining the above-mentioned pyrolytic method with other manufacturing method(s), for example, manufacturing the films of refractive indices n1, n2 and n3 through the pyrolytic method, whereafter the film of refractive index n4 may be manufactured thereupon by the sol-gel method or the spattering method.

As the ingredients to be used when forming a film or layer of silicon through the pyrolytic method may be included a silane gas, such as of monosilane, disilane, or dichlorosilane, silicon tetrachloride, etc.

As the ingredients to be used when forming a film or layer of silicon oxide through the pyrolytic method, included may be a silicon ingredient such as a silane gas such as monosilane, disilane, or dichlorosilane, an inorganic compound such as silicon tetrachloride, etc., or an organic compound such as tetraethoxysilane, tetramethoxysilane, dibutoxy-diacetoxysilane, etc.

Also, as an oxygen source included may be oxygen, ozone, acetone, carbon dioxide, etc. In the case of using the silane gas, it is possible to form the film with improved stability by adding ethylene or ethane, etc., thereto.

As the ingredients to be used when forming a film of tin oxide through the pyrolytic method, included may be an inorganic compound, such as tin tetrachloride, etc., or monomethyl tin trichloride, monobutyl tin trichloride, dimethyl tin dichloride, dibutyl tin dichloride, tetramethyl tin, tetrabutyl tin, dibutyl tin diacetate, dioctyl tin diacetate, etc.

As the ingredients to be used when forming a film of titanium oxide through the pyrolytic method, included may be an inorganic compound, such as titanium tetrachloride, titanium isopropoxide, acetyl acetonate titanium, etc.

The films or layers which are formed by the pyrolytic method cause no deterioration due to the heating process, therefore it is possible to treat a tempering process or a bending process on the optical reflector, after the manufacturing thereof.

(Embodiment)

Figure 1B:
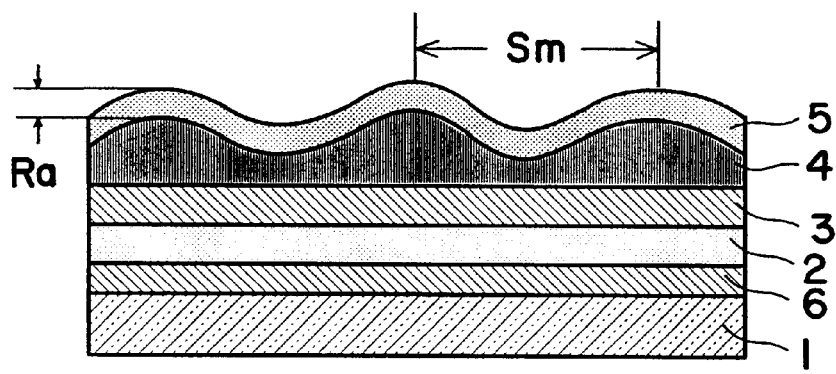
Figure 1C:
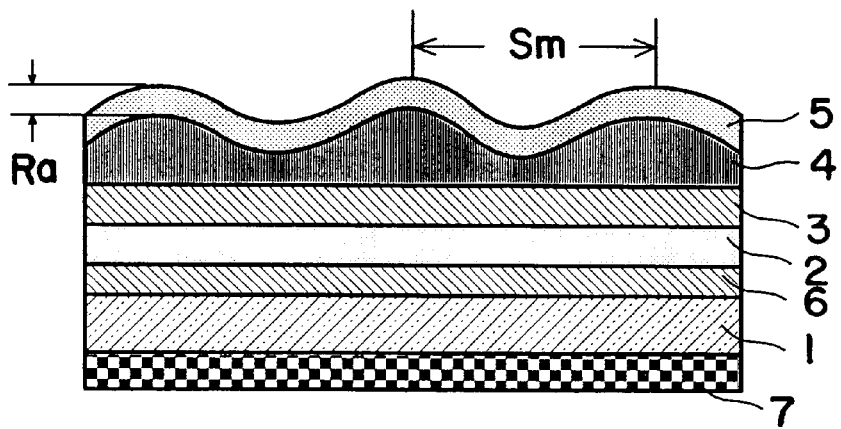

FIGS. 1(a) to (c) are enlarged cross-sectional views showing examples of optical reflectors according to the present invention.

In the embodiment shown in the cross-sectional view of FIG. 1(a), upon the surface of the glass substrate 1 are formed a silicon film 2, a silicon oxide film 3, a tin oxide film 4 and a titanium oxide film 5, sequentially.

In measurement of the distance between the concave and the convex portions, observed using an atomic force microscope (AFM) or an electron microscope, an average value (Sm) thereof is calculated from the measured cross-section curve. However, the average distance (Sm) between the concave and the convex portions is preferably between 4 nm and 300 nm. Also, a roughness (Ra) of the surface is preferably between 1.5 nm and 50 nm.

In the embodiment shown in the cross-sectional view of FIG. 1(b), as an undercoating film 6 is formed a film of tin oxide between the glass substrate 1 and the silicon film 2. And, in the embodiment shown in the cross-sectional view of FIG. 1(c), an opaque layer 7 is formed upon the reverse surface of the glass substrate.

Figure 2:
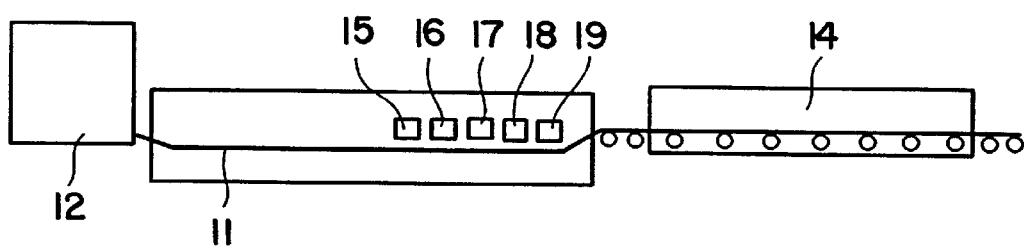
FIG. 2 shows an outline view of an apparatus or equipment for forming films, in a float glass plate production line for manufacturing the optical reflector according to the present invention.

FIG. 2 shows an outline view of an example of the apparatus or equipment for forming films, in a float glass plate production line for manufacturing the optical reflector according to the present invention.

In the present embodiment, the above-mentioned films or layers are formed through the pyrolytic CVD (Chemical Vapor Deposition) method within a tin bath 13 when producing the float glass plate as shown in FIG. 2. The forming of the films or layers is performed, after the glass plate is formed at a predetermined thickness, in a time period when the glass has a high temperature, i.e., within a range from 600° C. to 750° C. For forming the films or layers, the film forming apparatuses 15 to 19 are inserted within the tin bath 13, individually, wherein the silicon film is formed by supplying the monosilane being diluted with nitrogen, the silicon oxide film by supplying the monosilane, ethylene and oxygen being diluted with nitrogen, the tin oxide film by supplying the dimethyl tin dichloride, oxygen and water being diluted with nitrogen, and the titanium oxide film by supplying the titanium isopropoxide and oxide being diluted with nitrogen, to the respective film forming apparatuses.

EXAMPLES 1 TO 5

Comparisons 1 to 4

Examples 1 to 5 and comparisons 1 to 4 are manufactured by washing and cutting the glass plate into plates being 100 mm×100 mm, after forming the silicon film, the silicon oxide film, the tin oxide film and the titanium oxide film on the glass surface, at the respective predetermined thickness thereof, sequentially, using the film forming apparatuses 15 to 19, and then cooling the glass plate using a lehr.

EXAMPLES 6 TO 12

Comparison 5

Examples 6 to 12 and comparison 5 are manufactured by washing and cutting the glass plate into plates being 100 mm×100 mm, after forming the tin oxide film (the undercoating film), the silicon film, the silicon oxide film, the tin oxide film and the titanium oxide film on the glass surface, at the respective predetermined thickness thereof, sequentially, using the film forming apparatuses 15 to 19, and then cooling the glass plate using a lehr.

Though all the films or layers are formed within the tin bath 13 using the pyrolytic CVD (Chemical Vapor Deposition) method in the present embodiments, however the films or layers of oxides, such as the silicon oxide film, the tin oxide film, the titanium oxide film, etc., may be formed within the cooling portion 14. In this case, it is possible to employ not only the CVD (Chemical Vapor Deposition) method, but also to use a spray method using the ingredients in a liquid and/or powder form. Further, they may be manufactured by using the pyrolytic method and another film forming method(s). For example, the silicon film, the silicon oxide film and the tin oxide film may be formed through the pyrolytic method, while the titanium oxide film through the sol-gel method or the spattering method.

In each of those embodiments being formed in the methods mentioned above, the silicon film 2, the silicon oxide film 3, the tin oxide film 4, the titanium oxide film 5 and the undercoating film are as described below in the film thickness thereof, while a reflectivity to visible light which is incident upon the front surface of the films is equal to or greater than 75%, and the value of $\{(a^*)^2+(b^*)^2\}^{1/2}$ is equal to or greater than 0 and is equal to or less than 10, when representing the reflective color tone by a* and b* (psychometric chroma coordinates).

Film thickness:

the undercoating film of tin oxide: being equal to or greater than 0 nm and equal to or less than 100 nm;

the silicon film: being equal to or greater than 15 nm and equal to or less than 45 nm;

the silicon oxide film: being equal to or greater than 30 nm and equal to or less than 60 nm;

the tin oxide film: being equal to or greater than 10 nm and equal to or less than 80 nm; and the titanium oxide film: being equal to or greater than 10 nm and equal to or less than 80 nm.

In this instance, the refractive indices of the silicon film, the silicon oxide film, the tin oxide film and the titanium oxide film at the wavelength of 500 nm lie within the following ranges:

the silicon film: from 4.1 up to 4.7;

the silicon oxide film: from 1.44 to 1.46;

the tin oxide film: from 1.9 to 2.1; and the titanium oxide film: from 2.3 to 2.5.

In Table 1, there are shown the film thickness of each layer in the respective embodiments and the comparisons, and the value of $\{(a^*)^2+(b^*)^2\}^{1/2}$ when representing the reflective color tone by a* and b* (psychometric chroma coordinates). Further, the reflectivity to visible light is measured in accordance with JIS R3106-1998, the color tone of reflection light with JIS Z 8722-1982, by means of a spectrophotometer of type UV-3100, Shimazu-Seisakusho (Manufacturer) Co., Ltd. (Japan), and L* and a* and b* of the psychometric chroma coordinates of a* and b* color system, defined in JIS Z 8729-1980, are calculated therefrom.

TABLE 1

| | Film Thickness of Respective Layers (nm) | | | | | Reflectivity to Visible | |
|---|---|---|---|---|---|---|---|
| | Titanium Oxide | Tin Oxide | Silicon Oxide | Silicon | Tin Oxide | Light (%) | $\sqrt{(a^{*2} + b^{*2})}$ |
| Example 1 | 50 | 20 | 60 | 30 | | 83.3 | 7.6 |
| Example 2 | 50 | 30 | 40 | 30 | | 79.7 | 8.3 |
| Example 3 | 50 | 10 | 60 | 45 | | 77.2 | 5.6 |
| Example 4 | 10 | 80 | 50 | 25 | | 76.3 | 9.5 |
| Example 5 | 80 | 10 | 40 | 25 | | 78.3 | 9.6 |
| Example 6 | 40 | 20 | 60 | 30 | 20 | 81.3 | 5.3 |
| Example 7 | 50 | 10 | 60 | 40 | 60 | 75.0 | 2.8 |
| Example 8 | 50 | 30 | 60 | 15 | 30 | 76.0 | 8.7 |
| Example 9 | 50 | 30 | 30 | 30 | 20 | 76.4 | 7.9 |
| Example 10 | 80 | 10 | 50 | 20 | 10 | 77.6 | 8.6 |
| Example 11 | 60 | 10 | 60 | 25 | 50 | 78.3 | 5.2 |
| Example 12 | 50 | 20 | 60 | 30 | 100 | 79.2 | 7.9 |
| Comparison 1 | 60 | 40 | 20 | 30 | | 75.9 | 18.5 |
| Comparison 2 | 10 | 90 | 50 | 30 | | 72.6 | 32.5 |
| Comparison 3 | 90 | 10 | 40 | 30 | | 71.9 | 42.5 |
| Comparison 4 | 50 | 10 | 60 | 50 | | 72.1 | 4.6 |
| Comparison 5 | 60 | 20 | 60 | 10 | 40 | 69.0 | 10.7 |

As is indicated in Table 1, the reflectivity to visible light is equal to or greater than 75% with the film construction of each of the embodiments 1 to 12, and the values of $\{(a^*)^2+(b^*)^2\}^{1/2}$ are equal to or less than 10. Alternately, with the film construction of each of the comparisons 1 to 5, the reflectivity to visible light is less than 75% and the values of $\{(a^*)^2+(b^*)^2\}^{1/2}$ are greater than 10.

As is fully explained in the above, according to the present invention, the glass substrate formed directly or indirectly via the undercoating film, with the film of refractive index n1, the film of refractive index n2, the film of refractive index n3, and the film of refractive index n4, wherein the film of low refractive index n2 comprised of such material as silicon oxide is set to be equal to or greater than 30 nm and be equal to or less than 60 nm, it is possible to produce an optical reflector, having the reflectivity to visible light being equal to or greater than 75% upon the surface and having the value of $\{(a^*)^2+(b^*)^2\}^{1/2}$ being equal to or greater than 0 and equal to or less than 10, when representing the reflective color tone by a* and b* (psychometric chroma coordinates), by using pyrolysis to take advantage of its good yield rate and to achieve better efficiency, thereby enabling to reduce the manufacturing cost thereof.

Further, by covering the outermost surface with the film having the good durability, overcome is a necessity for a special process of treating, such as with a protection layer or the like.

What is claimed is:

1. An optical reflector having a glass substrate, upon at least one of main surfaces thereof are formed, sequentially, a film having a refractive index n1 at a wavelength of 550 nm; a film having a refractive index n2 at said wavelength; a film having a refractive index n3 at said wavelength; and a film having a refractive index n4 at said wavelength, wherein:

there is established a relationship as indicated below between refractive indices n1, n2, n3 and n4;

$n1 \geq n4 > n3 > n2$ film thickness of said film of the refractive index n2 is equal to or greater than 30 nm and is equal to or less than 60 nm;

a reflectivity to visible light is equal to or greater than 75% upon said film of the refractive index n4; and a value of $\{(a^*)^2+(b^*)^2\}^{1/2}$ is equal to or greater than 0 and is equal or less than 10, when representing a color tone of reflected light upon a surface of said film of refractive indices n4 by a* and b* (psychometric chroma coordinates).

2. An optical reflector as defined in claim 1, wherein said film having the refractive index n2 contains silicon oxide ($SiO_2$) as a main ingredient thereof.

3. An optical reflector as defined in claim 1, wherein said film having the refractive index n3 contains tin oxide (SnO) as a main ingredient thereof.

4. An optical reflector as defined in claim 1, wherein said film having the refractive index n4 contains titanium oxide ($TiO_2$) as a main ingredient thereof.

5. An optical reflector as defined in claim 1, wherein said film having the refractive index n1 contains silicon (Si) as a main ingredient thereof.

6. An optical reflector as defined in claim 1, wherein an undercoating film is formed between said film having the refractive index n1 and said glass substrate.

7. An optical reflector as defined in claim 6, wherein said undercoating film is a film of tin oxide.

8. An optical reflector as defined in claim 1, wherein film thickness of said film having the refractive index n1, of said film having the refractive index n3 and of said film having the refractive index n4 are in a region as indicated below, respectively:

the film having the refractive index n1 is equal to or greater than 15 nm and is equal to or less than 45 nm;

the film having the refractive index n3 is equal to or greater than 10 nm and is equal to or less than 80 nm; and the film having the refractive index n4 is equal to or greater than 10 nm and is equal to or less than 80 nm.

9. An optical reflector as defined in claim 1, wherein an opaque layer is formed on a side of said glass substrate, being reverse to that on which said films are formed.

10. A method for manufacturing the optical reflector having a glass substrate, as defined in claim 1, comprising the steps of:

forming a film having a refractive index n1 at a wavelength of 550 nm;

forming a film having a refractive index n2 at said wavelength;

forming a film having a refractive index n3 at said wavelength; and forming a film having a refractive index n4 at the said wavelength (wherein $n1 \geq n4 > n3 > n2$), sequentially, upon at least one of main surfaces thereof.

11. A method for manufacturing the optical reflector as defined in claim 10, wherein an undercoating film is formed between said film having the refractive index n1 and said glass substrate.

12. A method for manufacturing the optical reflector as defined in claim 10, wherein said undercoating film, said film having the refractive index n1, said film having the refractive index n2, said film having the refractive index n3 and said film having the refractive index n4 are formed, sequentially, through a pyrolytic method upon a surface of said glass at high temperature.

* * * * *